United States Patent Office 3,112,315
Patented Nov. 26, 1963

3,112,315
PRODUCTION OF DODECAHYDRO-1,4,7,9b-TETRAAZAPHENALENES
John L. Van Winkle, Castro Valley, Calif., assignor to Shell Oil Company, New York, N.Y., a corporation of Delaware
No Drawing. Filed July 31, 1961, Ser. No. 127,823
8 Claims. (Cl. 260—256.4)

This invention relates to preparation of polycyclic heterocyclic compounds. More particularly, it relates to preparation of certain polyhydrotetraazaphenalenes and to their preparation from ammonia.

Although polyhydrotetraazaphenalenes having the central ring structure

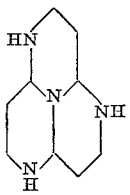

are known, such compounds have heretofore been regarded as laboratory curiosities. It has now been found that these compounds are not only useful themselves as curing agents for epoxy resins, fertilizers and the like, but they are also useful as intermediates in the preparation of corrosion inhibitors and other industrial chemicals. The development of an effective economical method of producing these tetraazaphenalenes is therefore of current commercial interest.

It is an object of the present invention to provide a process for preparing polyhydrotetraazaphenalenes. A further object of the invention is the provision of a process for preparing such compounds from ammonia and certain unsaturated aldehydes. Still a further object is a process for preparing such compounds under moderate conditions of heat and pressure. Other objects of the process of the invention will be apparent from the following detailed description thereof.

These objects are accomplished in the invention by the process which comprises reacting together an alpha,beta-monounsaturated alkenal and ammonia in an alkanol at a temperature above about 80° C. and at superatmospheric pressure. By alpha,beta-monounsaturated alkenal is meant an alpha,beta-unsaturated aliphatic or araliphatic aldehyde wherein the formyl group is attached to the terminal carbon atom of a monoolefinically unsaturated acyclic hydrocarbon. Such compounds have the general formula

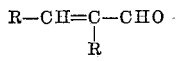

wherein each R is a monovalent radical selected from the group consisting of the hydrogen atom and alkyl, cycloalkyl, aryl, aralkyl and alkaryl radicals. Preferred aromatic radicals are the hydrocarbyl monovalent mononuclear radicals having no more than 9 carbon atoms, e.g., phenyl, tolyl, xylyl, and the like. While the radicals R may have any desired length or configuration, it is preferred that these radicals be acyclic radicals having up to 8 carbon atoms.

Typical of these compounds are methacrolein, crotonaldehyde, alpha-phenyl acrolein, cinnamaldehyde, 2-pentenal, 2-hexenal, 2-heptenal, 4-methyl-2-pentenal, 5-ethyl-2-heptenal, and the like. Preferred alkenals are those having no more than nine carbon atoms, while the most preferred alkenal, which is the most reactive under the conditions of the reaction, is acrolein.

The alkenal is reacted under the conditions described with ammonia in solution in an alcohol. The ammonia employed, generally designated by the formula $NH_3$, may be charged to the reaction zone as pure ammonia, as a mixture of gases comprising ammonia, or as compounds giving rise to ammonia under the reaction conditions. Most conveniently, the ammonia may be charged to the reaction zone as a liquid, or it may be predissolved in one of the process liquids such as the alkanol solvent. For example, excellent results have been obtained when the ammonia was charged as an approximately 50% w. solution in methanol.

It has been found that best results are obtained when the alkenal is introduced into a substantial excess of the alcoholic ammonia under the reaction conditions. In this way, the concentration of the unreacted ammonia in the liquid reaction mixture at any given time must be large compared to that of the entering alkenal, whatever the final total reactant ratios. Instantaneous ammonia/alkenal ratios of greater than about 50/1 are preferred, while ratios of greater than about 200/1, up to about 1000/1, afford best yields. Highest yields are obtained when the ammonia, the alkenal, and the alcohol employed are substantially anhydrous, although minor amounts of such impurities as inhibitors, denaturants, i.e., ethyl acetate, benzene, and the like, can be tolerated without materially impairing the process of the invention.

The alkenal and the ammonia are reacted together in the liquid phase in solution in an alcohol. It has been found the reaction will not take place in the vapor phase to yield the polyhydrotetraazaphenalenes and that when it is conducted in the absence of solvent predominantly amorphous polyaminic materials of undefined structure and wide molecular weight range are obtained. When acrolein and ammonia are brought together in aqueous solution, a white polymeric substance is generally obtained. When, however, the solvent employed consists essentially of an alcohol, preferably an alkanol, and most preferably a lower acyclic alkanol, the product is the unique symmetrical saturated tetraazaphenalene in high yield.

Suitable alkanols include ethanol, propanol, isopropanol, butanol, sec-butanol, tert-butanol, cyclohexanol and pentanol. Polyhydric alcohols, such as ethylene glycol, propylene glycol, hexylene glycol, 1,5-pentanediol and 1,2,6-hexanetriol, may also be employed as may such ether-alcohols as the Cellosolves, diethylene glycol, triethylene glycol, and mixtures thereof. Alkanols having up to ten carbon atoms, i.e., octanol, nonanol and decanol, may be employed but since the viscosity of the alkanol increases with increasing molecular weight, higher alkanols are less convenient to handle and with their use lower yields of product are obtained. Consequently, the preferred alkanols are those having up to four carbon atoms, e.g., methanol, ethanol, propanol, isopropanol, butanol, while the most preferred alkanol is methanol.

The amount of alkanol required is that volume of alkanol required to dissolve the reactants. In general, a volume of solvent considerably greater than the volume of alkenal employed is required. Sufficient solvent to maintain the ammonia in solution under the conditions of temperature and pressure has been found to be necessary, since the process of the invention is conducted in the liquid phase.

To conduct the reaction, the reactants and solvent are brought together in the reaction zone under suitable conditions of temperature and pressure. Temperatures of at least about 80° C. are required to conduct the reaction at an economical rate, and to maintain the reaction mixture in the liquid phase the use of superatmospheric pressures are required. Autogenous pressure is all that is required or, alternatively, the reaction system may be pressured with ammonia to obtain high pressures. Pressures from about 100 p.s.i.g. to about 5000 p.s.i.g. are convenient to employ in conventional process equipment, and excellent yields of product are obtained when the reaction is conducted at temperatures from about 100–200° C. and pressures of from about 500–1500 p.s.i.g. Since the saturated tetraazaphenalenes of the invention are subject to thermal degradation, lower yields are obtained when temperatures in excess of about 250° C. are employed.

Preparation of the products of the invention under the conditions set forth above takes place rapidly and to high yield in the absence of added catalysts. For best results, it is desirable to conduct the reaction under substantially anhydrous conditions, so that predrying of the compounds charged to the reaction zone may be required.

The reaction may be conducted in a batch, semibatch or continuous manner. Formation of the products is very rapid, taking place under the reaction conditions without an induction period and virtually as fast as the reactants are brought into contact. At the close of the reaction, the solvent and excess ammonia are separated, as by flashing off, and the product is readily recovered by cooling the reaction mixture. Upon removal of the solvent and any unreacted starting materials, the residue is a viscous liquid which solidifies to a white, crystalline solid product.

The product may be recovered from the reaction mixture and purified in a variety of ways, as by extraction, distillation, crystallization, or any combination thereof. For example, unsaturated polymeric by-products of the reaction are readily removed by hydrogenating the crude reaction mixture in the presence of a hydrogenation catalyst such as Raney nickel or copper chromite, distilling off the light ends, and extracting the product from the residue with a paraffinic hydrocarbon, such as pentane, hexane or isooctane. Alternatively, the crude reaction mixture may readily be fractionated at reduced pressure to afford suitable separations of the products and reactants.

Upon recovery and purification, the polyhydrotetraazaphenalenes of the invention are found to be white or colorless crystalline materials, characterized by sharp melting points. The compounds are miscible with water and such alkanols as methanol and ethanol, but are only moderately soluble in chlorinated solvents such as carbon tetrachloride. They are somewhat hygroscopic, but are crystalline and stable when stored in an anhydrous atmosphere at room temperature.

These compounds have been determined to have the general structure

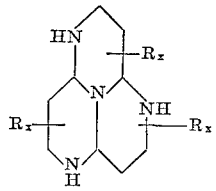

where each R has the above meaning and $x$ is an integer from 0 to 2. They are thus dodecahydro-1,4,7,9b-tetraazaphenalene or substituted dodecahydro-1,4,7,9b-tetraazaphenalenes. Exemplary of such compounds are those obtained from the following alpha,beta-monounsaturated alkenals:

| Alkenal | Product |
|---|---|
| Acrolein | Dodecahydro-1,4,7,9b-tetraazaphenalene. |
| Methacrolein | 3,6,9-Trimethyl-dodecahydro-1,4,7,9b-tetraazaphenalene. |
| Crotonaldehyde | 2,5,8-Trimethyl-dodecahydro-1,4,7,9b-tetraazaphenalene. |
| Alpha-methyl crotonaldehyde | 2,3,5,6,8,9-Hexamethyl-dodecahydro-1,4,7,9b-tetraazaphenalene. |
| Alpha-phenyl acrolein | 3,6,9-Triphenyl-dodecahydro-1,4,7,9b-tetraazaphenalene. |

The compounds have a variety of uses. For example, they have been found to be excellent curing agents for epoxy resinous materials such as Epon® 828. They are also effective fertilizers, since under soil conditions they slowly decompose in situ to yield ammonia. Because of their solubility in alcohols, they are effective cattle feed supplements, serving at once as nitrogenous additives and ethanol denaturants.

The following examples will illustrate the novel compounds of the invention and the manner in which they may be prepared. It should be understood, however, that these examples are merely illustrative, and are not to be regarded as limitations to the appended claims, since the basic teachings thereof may be varied at will as will be understood by one skilled in the art. In the examples, the proportions are expressed in parts by weight unless otherwise noted.

*Example I*

A solution consisting of 47.7% w. of acrolein in methanol was pumped into a reactor containing anhydrous ammonia in methanol heated to 150° C., using a molar ratio of ammonia to acrolein of 11:1.

The reactor was then cooled and emptied and the reaction mixture fractionated under reduced pressure at 100° C. After the light components had been separated, the residue was a viscous oil which crystallized at 95–100° C. The crude product was Claisen distilled to yield a white crystalline solid having a boiling point of 110° C./0.1 mm. Hg. Upon recrystallization from carbon tetrachloride and vacuum sublimation, white needle-like crystals of product were obtained which had a melting point of 118–120° C.

Upon analysis of the product, the following data were obtained:

| | Mol. wt. | Percent | | | Total basic nitrogen eq./100 g. |
|---|---|---|---|---|---|
| | | C | H | N | |
| Calculated for $C_9H_{18}N_4$ | 182 | 59.3 | 9.9 | 30.7 | 1.65 |
| Found | 182 | 59.2 | 10.1 | 30.2 | 1.66 |

Infrared and Raman spectra data indicated that the compound was cyclic in nature with neither olefinic nor —C=N— unsaturation. The infrared spectrum showed only =NH groups with no —NH$_2$ groups present. Comparison of the spectra showed that the molecule had no center of symmetry. On the basis of these and chemical analytical data, it was established that the product was dodecahydro-1,4,7,9b-tetraazaphenalene. The compound was miscible with water, ethanol and methanol, and moderately soluble in carbon tetrachloride.

*Example II*

Into a one-liter Hastelloy-B horizontally stirred autoclave was continuously passed ammonia through one port and a solution of equal volumes of acrolein and methanol in the other, the product being removed continuously through a regulating valve at the bottom of the reactor. The reactor was operated at an ammonia pressure of 1500 p.s.i.g. and a reaction temperature of 150° C. The molar ratio of ammonia to acrolein charged was 11:1.

Using this procedure, a charge of 200 cc. methanol and 320 g. of ammonia was made. At the end of the run the reaction mixture was hydrogenated over Raney nickel at 100° C. in order to hydrogenate the unsaturated polymeric by-products. The mixture was then fractionally distilled at 100° C./1–2 mm., and the residue extracted seven times with hexane containing 5–7% CCl$_4$, using two volumes of solvent per mole of product.

The product was then crystallized to yield white needle-like crystals which were recovered by filtration. Upon analysis, the product was found to be dodecahydro-1,4,7,9b-tetraazaphenalene in 71.5% yield.

*Example III*

A run on the continuous reactor described in Example II was repeated using the conditions described in that example. However, in this run the reaction mixture was fractionally distilled and the residue after removal of the solvent recrystallized from carbon tetrachloride. In this way a 71.2% yield of dodecahydro-1,4,7,9b-tetraazaphenalene was obtained.

*Example IV*

A solution of crotonaldehyde dissolved in an equal volume of methanol was pumped into a reactor containing anhydrous ammonia heated at 150° C., using a crotonaldehyde/ammonia molar ratio of 11/1. A nearly quantitative yield of a viscous liquid distilling at 125° C./0.6 mm. was obtained. Upon standing, this liquid crystallized to yield regular light-colored crystals.

Spectral and carbon-hydrogen-nitrogen data indicated that the compound was cyclic and had the following composition:

|  | C | H | N | Mol. wt. |
|---|---|---|---|---|
| Calculated for $C_{12}H_{24}N_4$ | 64.3 | 10.7 | 25 | 224 |
| Found | 64.5 | 10.8 | 24.9 | 224 |

This compound was determined to be 2,5,8-trimethyl-dodecahydro-1,4,7,9b-tetraazaphenalene.

Using this method, 2,5,8-trioctyl-dodecahydro-1,4,7,9b-tetraazaphenalene is readily prepared from 2-nonenal and ammonia in ethanol.

*Example V*

Two continuous runs were carried out in the one-liter Hastelloy-B horizontally stirred autoclave reacting crotonaldehyde with ammonia to form 2,5,8-trimethyl-dodecahydro-1,4,7,9b-tetraazaphenalene.

Crotonaldehyde dissolved in an equal volume of methanol and ammonia were pumped continuously into the reactor heated at 150° C. using a $NH_3$/crotonaldehyde ratio of 11/1. The product was recovered by distillation to give a 94% yield of 2,5,8-trimethyl-dodecahydro-1,4,7,9b-tetraazaphenalene as a pale yellow viscous oil boiling at 127–129° C. at 0.2 mm.

The second run was carried out in the same manner except that the crude product was hydrogenated at 100° C. under 1000 lbs. hydrogen pressure in the presence of Raney nickel before distillation. In this run, an 87.5% yield of product was obtained. The product from this run was a water-white viscous liquid as compared to the yellow product obtained in the first run.

2,5,8-triphenyl-dodecahydro-1,4,7,9b-tetraazaphenalene was obtained when cinnamaldehyde was reacted with ammonia in this manner.

*Example VI*

Methacrolein was reacted with ammonia in the same manner as the crotonaldehyde runs described above. A viscous pale yellow liquid boiling at 115–119° C. at <0.1 mm. was obtained. The infrared spectrum was consistent with the cyclic structure proposed for the acrolein and crotonaldehyde products. The amount of product obtained was equivalent to a 49.4% yield of 3,6,9-trimethyl-dodecahydro-1,4,7,9b-tetraazaphenalene based on the charged methacrolein.

*Example VII*

A continuous process for the reaction of acrolein with ammonia to form dodecahydro-1,4,7,9b-tetraazaphenalene gave 97% yield of product based on the charged acrolein. The process consisted of reacting a methanol solution of acrolein with anhydrous ammonia at 150° C. and 1500 lbs. pressure. The product was recovered by flashing off the excess ammonia, methanol and water which is formed in the reaction at 100° C. under reduced pressure, and then extracting the product with boiling cyclohexane. The product was recovered from the cyclohexane by crystallization. The recovered product was a buff-colored solid melting at 115–120° C.

A reactor was set up which consisted of a one-liter horizontally stirred autoclave. The acrolein and ammonia feeds were pumped into ports in the side of the vessel. The reactor ran under hydrostatic conditions with the product take-off at the top of the vessel. The vessel was heated to 150° C. and filled with a 51% w. solution of ammonia in methanol at a preset pressure of 1500 p.s.i.g. (318.2 g. ammonia, 305.8 g. methanol). Under these reaction conditions, the solution is liquid phase. A solution of acrolein in methanol was pumped into one port and ammonia into another port. The results of several runs carried out in this manner are tabulated in the following table:

| Feed rate of total reactants cc./min. | Residence time min. | Acrolein/MeOH/$NH_3$ ratio of reactants pumped into reactor | Percent yield of product |
|---|---|---|---|
| 47.8 | 19 | 1/1.78/7 | 90.2 |
| 23.9 | 38 | 1/1.78/7 | 92.8 |
| 23.9 | 38 | 1/9.1/21.1 | 94.8 |
| 11.95 | 76 | 1/1.78/7 | 97 |

*Example VIII*

A series of runs were made to determine the effect of temperature on the reaction. Using the technique described above and the tabulated acrolein/ammonia ratios, the following results were obtained:

| Acrolein/MeOH/$NH_3$ mole ratio | Reaction temp. ° C | Yield of adduct |
|---|---|---|
| 1/1.78/44.3 | 30–40 | 0% |
| 1/1.78/11.65 | 75 | 2–3% |
| 1/4.65/5.43 | 101–105 | 50.4 |
| 1/1.78/7 | 14 | 78 |

This application is a continuation-in-part of my copending application Serial No. 84,501, filed January 24, 1961, now abandoned.

I claim as my invention:

1. The process for preparing a dodecahydro-1,4,7,9b-tetraazaphenalene which comprises reacting together an alpha,beta-monounsaturated aldehyde represented by the formula

wherein each R is a monovalent radical selected from the group consisting of hydrogen, alkyl and phenyl and said aldehyde contains no more than nine carbon atoms, and ammonia in anhydrous alkanol of up to 10 carbon atoms at a temperature from about 80° C. to about 250° C. and at a pressure from about 100 p.s.i.g. to about 5000 p.s.i.g.

2. The process of claim 1 where the alkanol is an alkanol having up to 4 carbon atoms.

3. The process of claim 1 where the alkanol is methanol.

4. The process of preparing dodecahydro-1,4,7,9b-tetraazaphenalene which comprises reacting together acrolein and ammonia in anhydrous alkanol of up to 10 carbon atoms at a temperature of from about 80° C. to about 250° C. and at a pressure from about 100 p.s.i.g. to about 5000 p.s.i.g.

5. The process of claim 4 wherein the alkanol is an alkanol having up to 4 carbon atoms.

6. The process of claim 4 wherein the alkanol is methanol.

7. The process of claim 1 wherein the alkenal is crotonaldehyde.

8. The process of claim 1 wherein the alkenyl is methacrolein.

References Cited in the file of this patent

Delepine: Compt. Rend., 216, 649–52; 697–701; and 785 (1943).